United States Patent
Narendran et al.

(10) Patent No.: US 8,694,002 B1
(45) Date of Patent: Apr. 8, 2014

(54) USE OF IMSI DURING FEMTOCELL REGISTRATION TO AVOID IDENTIFIER CONFLICTS

(71) Applicant: Sprint Spectrum L.P., Overland Park, KS (US)

(72) Inventors: Rajveen Narendran, Olathe, KS (US); Cesar Perez, Sunnyvale, CA (US); Ryan Talley, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 14/027,325

(22) Filed: Sep. 16, 2013

Related U.S. Application Data

(62) Division of application No. 12/707,692, filed on Feb. 18, 2010, now Pat. No. 8,554,215.

(51) Int. Cl.
*H04W 4/00* (2009.01)

(52) U.S. Cl.
USPC ........ 455/435.1; 455/436; 455/444; 455/448; 455/449; 455/422.1; 370/331; 370/329; 370/328

(58) Field of Classification Search
USPC ........... 455/435.1, 436, 444, 448, 449, 422.1; 370/331, 329, 328
See application file for complete search history.

(56) References Cited

U.S. PATENT DOCUMENTS

| | | | |
|---|---|---|---|
| 7,996,035 B2 | 8/2011 | Nguyen et al. | |
| 8,369,853 B1* | 2/2013 | Sarkar et al. | 455/436 |
| 2007/0243872 A1 | 10/2007 | Gallagher et al. | |
| 2008/0207170 A1 | 8/2008 | Khetawat et al. | |
| 2009/0191844 A1 | 7/2009 | Morgan et al. | |
| 2011/0130116 A1 | 6/2011 | Yin et al. | |
| 2011/0255476 A1* | 10/2011 | Hossain et al. | 370/328 |
| 2012/0020293 A1 | 1/2012 | Nix et al. | |
| 2012/0294286 A1* | 11/2012 | Chaudry et al. | 370/331 |

OTHER PUBLICATIONS

Office Action in U.S. Appl. No. 12/707,692 mailed Jun. 5, 2012.
Office Action in U.S. Appl. No. 12/707,692 mailed Nov. 14, 2012.
Notice of Allowance in U.S. Appl. No. 12/707,692 mailed May 24, 2012.

* cited by examiner

*Primary Examiner* — Khai M Nguyen

(57) ABSTRACT

A method and system is disclosed for including an IMSI in an EVDO access request. When an access terminal determines that any access request it makes will be sent to a micro-type base station, the access terminal will include its IMSI in any EVDO access request. When a micro-type base station receives an EVDO access request containing an IMSI of the requesting access terminal, the micro-type base station will use the included IMSI to establish and identify a data connection to a PDSN.

16 Claims, 7 Drawing Sheets

USE OF IMSI DURING FEMTOCELL REGISTRATION TO AVOID IDENTIFIER CONFLICTS

CROSS-REFERENCE TO RELATE APPLICATIONS

This application is a division of U.S. application Ser. No. 12/707,692, filed Feb. 18, 2010, which application is incorporated in its entirety herein by reference.

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

A subscriber (or user) in a service provider's wireless communication system accesses the system for communication services via an access terminal, such as a cellular telephone, pager, or appropriately equipped portable computer, for instance. When an access terminal is positioned in a cell, the access terminal (also referred to herein by "AT") communicates via an RF air interface with the BTS antenna of the cell. Consequently, a communication path or "channel" is established between the AT and the transport network, via the air interface, the BTS, the BSC and the switch or gateway.

Functioning collectively to provide wireless (i.e., RF) access to services and transport in the wireless communication system, the BTS, BSC, MSC, and PDSN, comprise (possibly with additional components) what is typically referred as a Radio Access Network (RAN). In practice, the RAN may be organized in a hierarchical manner, with multiple BTSs under the control of a single BSC, multiple BSCs linked to a single MSC, and multiple MSCs in one region or metropolitan area connecting to RANs in other regions or metropolitan areas by way of gateway MSCs or other inter-regional switches.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

The functional combination of a BTS of a cell or sector with a BSC is commonly referred to as a "base station," although the actual physical configuration can range from an integrated BTS-BSC unit to a distributed deployment of multiple BTSs under a single BSC, as described above. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time. On this scale, coverage is referred to as "macro-network coverage" and the base station is referred to as a "macro-type base station."

More recently, a type of base-station functional unit aimed at coverage over a much smaller physical area and at concurrent support of many fewer subscribers has been introduced. Referred to generically herein as a "micro-type base station," this device, roughly comparable in size to desktop phone, can operate to fill in gaps in macro-network coverage (e.g., in buildings), as well as provide limited and exclusive coverage to individual subscribers within residential (or other small-scale) spaces. As such, macro-network service providers have begun offering micro-type base stations as consumer devices, under the more technical moniker of "femtocell." In addition to "femtocell," other terms for a micro-type base station used interchangeably herein include "femto base station," "femto BTS," "picocell," "pico BTS," "microcell," "micro BTS," and "Low-Cost Internet Base Station" ("LCIB"). The prefixes "femto," "pico," and "micro" are also used herein to refer correspondingly to respective coverage areas. Note that "low-cost" is not intended to be limiting; that is, devices of any cost may be categorized as LCIBs, although it may be expected that most LCIBs will typically be less expensive on average than most macro-network base stations.

A typical femtocell may be considered to be essentially a low-power, low-capacity version of a macro-type base station, providing the same RF interface for wireless access, only for a much smaller physical coverage area. However, instead of connecting directly to an MSC, PDSN, other network switch, a femtocell communicates with the service provider's network via one or another form of broadband connection associated with or available to the consumer-owner (or renter) of the femtocell. With respect to a subscriber's wireless access, the small coverage area of a femtocell is viewed by the wireless communication system in the same manner as any other macro coverage area (e.g., cell or sector). In particular, a subscriber may move between neighboring coverage areas of macro-type base stations and femtocells, and even between neighboring coverage areas of different femtocells, in the same way the subscriber moves between neighboring macro coverage areas.

More specifically, as a subscriber at an access terminal moves between wireless coverage areas of a wireless communication system, such as between cells, sectors, or femto coverage areas, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or base station) to a "target" cell or sector (or base station).

In some wireless communication systems or markets, a wireless service provider may implement more than one type of air interface protocol within a single system. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856

Rel. 0, A, or other version thereof (hereafter "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal." Handoff between different air interface protocols (or, more generally, between different access technologies) is known as "vertical" handoff.

OVERVIEW

When a subscriber at an access terminal initiates a call or data session via the RAN, one or another authentication and authorization procedure is carried out to verify the identity of the subscriber and validate the permissions and privileges required for the requested service. Typically, some form of identifier of the access terminal is used in the procedure, and becomes associated with the call or data session established as a result of the initiation process. The specific identifier depends on the type of session being created and the air interface protocol under which the session request is made, among other possible factors.

In particular, when an AT requests a data connection under IS-2000, it includes an "International Mobile Subscriber Identifier" ("IMSI") in the request. The BSC receiving the request then uses the IMSI in the request to establish and identify a segment or "leg" of the data connection between the BSC and a PDSN. When a request for a data connection is made under IS-856, the AT includes an "Electronic Serial Number" ("ESN") in the request, but not the IMSI. In this case, the BSC uses the ESN from the request in a transaction with an "Access Node Accounting-Authentication-Authorization" ("AN-AAA") server in order (among other purposes) to determine a unique IMSI associated with the ESN (and thereby, with the AT). The BSC then uses the IMSI acquired from the server to establish and identify the segment of the data connection between the BSC and a PDSN.

In a typical RAN deployment comprising macro-type base stations, the number of BSCs that require a connection to the AN-AAA server can be on the order of tens to hundreds (or more), but is generally well within a range that the server can accommodate. The server may actually be implemented according to a distributed architecture in which multiple server nodes each maintain a relatively few connections to different sets of the BSCs. In either case, the aggregate of all the connections between the BSCs and the server (or server nodes) does not represent a practical limitation with respect to system deployment. Consequently, the transaction between a BSC to the server to resolve an ESN to an IMSI as part of data-session setup under IS-856 is routinely supported.

The introduction of femtocells can significantly alter the number of base stations requiring connections to the AN-AAA server. Specifically, since femtocells integrate the functionality of a BSC and are (at least to some extent) marketed as consumer devices, the number of femtocells that could attempt to access the AN-AAA server will scale roughly like the number (or some sizeable fraction thereof) of subscribers of a service provider. Because this number generally exceeds the number of individual BSCs that can connect to the AN-AAA server, femtocells are configured to operate without a connection to the AN-AAA server. More particularly, when a femtocell receives a request from an AT for a data session under IS-856, the femtocell assigns an IMSI to the AT for the requested data session and uses the assigned IMSI to identify the segment of the data connection between the femtocell and the PDSN. In practice, the assigned IMSI is one of a pool of assignable IMSIs maintained at the femtocell.

While local assignment of an IMSI by a femtocell for IS-856 data sessions addresses the absence of a connection between the femtocell and the AN-AAA server, there is generally no guarantee that two or more femtocells connected to the same PDSN will choose unique IMSIs when each of the two or more femtocells makes such a local assignment. Since the PDSN identifies its data connections to a BTS or femtocell according to an IMSI, a conflict or "collision" of data connection identifiers can occur at a PDSN when two or more femtocells connected with the PDSN assign identical IMSIs to different respective data connections at the same time. This problem tends to be exacerbated by the potentially large number of femtocells that can connect to a PDSN at any one time.

Accordingly, embodiments of the present invention provide a method and system for providing a unique IMSI in an access request from an access terminal to a base station for an IS-856 data session when omitting the IMSI from the access request could otherwise lead to an IMSI collision at a PDSN or other network switch. More specifically, an AT will include its IMSI in an IS-856 access request to a base station when the AT determines that the base station is a femtocell. Additionally, a femtocell that receives an IS-856 access request containing an IMSI will use the IMSI to establish and identify a data connection to a PDSN, instead of locally assigning an IMSI. Advantageously, multiple femtocells connected to a common PDSN may establish different IS-856 data sessions with unique IMSIs, even when each femtocell lacks a connection to the AN-AAA server.

Hence, in one respect, various embodiments of the present invention provide, in an access terminal configured to operate in a wireless communication system that includes at least one micro-type base station, a method comprising: the access terminal operating in a first idle state in which at least: (i) the access terminal includes a particular identifier in any given access request for a data connection of a first protocol type, the particular identifier being uniquely associated with the access terminal and being required by the first protocol to be included in access requests for data connections of the first protocol type, and (ii) the access terminal omits the particular identifier in any given access request for a data connection of a second protocol type, the particular identifier not being specified by the second protocol to be included in access requests for data connections of the second protocol type; while operating in the first idle state, the access terminal making a first determination that any access request it makes will be sent to a micro-type base station; and based at least on the first determination, transitioning to operating in a second idle state in which at least: the access terminal includes the particular identifier in any given access request for a data connection of the second protocol type.

In another respect, various embodiments of the present invention provide, in a micro-type base station configured to operate in a wireless communication system, and further configured to support data connections of both a first protocol type and a second protocol type with access terminals operating in the wireless communication system, a method comprising: receiving an access request for a data connection of the second protocol type from an access terminal, the access request including a particular identifier that is uniquely associated with the access terminal, and the second protocol type not specifying the particular identifier to be included in access requests for data connections of the second protocol type; and establishing a data communication session of the second protocol type with the access terminal based at least in part on the particular identifier included in the access request.

In still another respect, various embodiments of the present invention provide an access terminal configured to operate in a wireless communication system that includes at least one micro-type base station, the access terminal comprising: means for operating in a first idle state in which at least: (i) the access terminal includes a particular identifier in any given access request for a data connection of a first protocol type, wherein the particular identifier is uniquely associated with the access terminal and is required by the first protocol to be included in access requests for data connections of the first protocol type, and (ii) the access terminal omits the particular identifier in any given access request for a data connection of a second protocol type, wherein the particular identifier is not specified by the second protocol to be included in access requests for data connections of the second protocol type; means for making a first determination that any access request the access terminal makes will be sent to a micro-type base station; and means for, based at least on the first determination, transitioning to operating in a second idle state in which at least: the access terminal includes the particular identifier in any given access request for a data connection of the second protocol type.

In yet another respect, various embodiments of the present invention provide a micro-type base station configured to operate in a wireless communication system, and further configured to support data connections of both a first protocol type and a second protocol type with access terminals configured to operate in the wireless communication system, the micro-type base station comprising: means for receiving an access request for a data connection of the second protocol type from an access terminal, wherein the access request includes a particular identifier that is uniquely associated with the access terminal, and wherein the second protocol type does not specify the particular identifier to be included in access requests for data connections of the second protocol type; and means for establishing a data communication session of the second protocol type with the access terminal based at least in part on the particular identifier included in the access request.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are conventionally referred to as "1X-RTT" communications, also abbreviated as just "1X." Packet-data communications under IS-856 are conventionally referred to as "EV-DO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
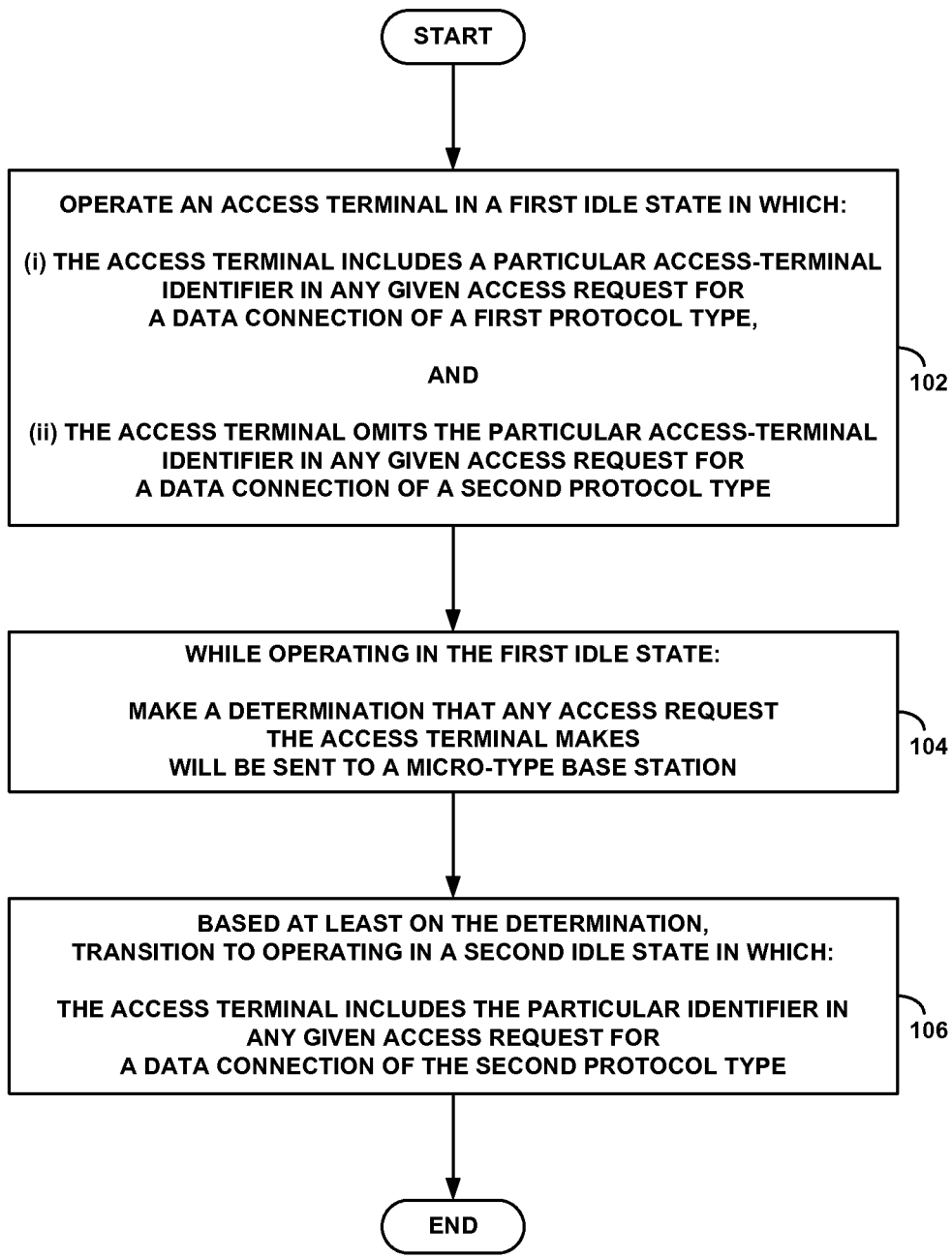
FIG. 1 is a flowchart depicting an example embodiment of a method of using an IMSI in a data session request to a micro-type base station.

FIG. 1 is a flowchart depicting an example embodiment of a method for providing a unique IMSI in an access request from an access terminal to a base station for an IS-856 data session. By way of example, the steps of the flowchart could be implemented in an access terminal in a wireless communication system that includes a macro-type base station and a micro-type base station (among other elements of a RAN), and that operates according to a CDMA family of protocols, including IS-856. As described above, a macro-type base station may then be taken to comprise a cell and/or sector BTS under the control of a BSC and configured to operate according to a CDMA family of protocols, including at least 1X-RTT and EVDO, while a micro-type base station may be considered a femtocell.

At step 102, the access terminal operates in a first idle state in which at least: (i) the access terminal includes a particular access-terminal identifier in any given access request for a data connection of a first protocol type, and (ii) the access terminal omits the particular access-terminal identifier in any given access request for a data connection of a second protocol type. In an idle state, such as the first idle state, the AT is not engaged in an active call or data session via any base station. Rather the AT monitors a paging channel (or other reverse-link control channel) for messages from the RAN, including messages alerting of an incoming call. The AT can also initiate a call or data session (e.g., in response to a user/subscriber instruction via an input interface of the AT) by sending an access request to a base station. In practice, the AT may send multiple access requests in order to initiate and (ultimately) establish a data session via a base station. However, for the purposes of the discussion herein, the term "access request" will be understood to encompass one or more access requests transmitted to the RAN in order to initiate and establish a call or data session.

In accordance with the example embodiment, the AT can initiate data sessions of at least a first protocol type and a second protocol type by sending an appropriate access request to a base station. For a data session of the first protocol type, the access request must, according to the first protocol, include the particular access-terminal identifier, while for a data session of the second protocol type, the access request is not specified as including the particular access-terminal identifier. More specifically, the particular access-terminal identifier is uniquely associated with the access terminal and is required by the first protocol to be included in access requests for data connections of the first protocol type. Further, the particular access-terminal identifier is not specified by the second protocol to be included in access requests for data connections of the second protocol type. The first idle state characterizes one set of behaviors of the AT with respect to access requests for data connections of either protocol type.

In further accordance with the example embodiment, the first protocol type is 1X-RTT and the second protocol type is EVDO. Hence a data session of the first protocol type is a 1X-RTT data session, while a data session of the second protocol type is an EVDO data session. Also in accordance with the example embodiment, the particular access-terminal identifier is a unique IMSI. In practice, IMSIs can be assigned by a service provider (e.g., owner/operator of the wireless communication system) to ATs associated with subscribers of the service provider. A unique IMSI is one that is assigned to only one subscriber access terminal at any given time. To the extent that different service providers have non-overlapping groups of IMSIs available to assign, a unique IMSI is one that is unique across all of the different service providers.

In conventional operation, a unique IMSI is required in access requests for 1X-RTT data sessions, but is not specified in IS-856 as a parameter in access requests for EVDO data sessions. As described below in more detail, both types of data sessions typically include a data-path segment (or "leg") comprising a data connection between the base station and a PDSN. The PDSN identifies this data connection according to an IMSI associated with the AT. For a 1X-RTT data session, a unique IMSI is provided in the initiating access request(s) by the AT as a matter of protocol, and is thereby supplied to the PDSN as a unique identifier for the data connection to the base station. For an EVDO data session, however, the AT does not conventionally include a unique IMSI in the access request(s), but rather provides a different identifier, namely an ESN. A base station, and more particularly a macro-type base station, receiving this access request generally resolves the ESN into a unique IMSI as part of an authentication and authorization transaction with the AN-AAA server. Thus, the PDSN again is supplied with a unique IMSI identifying the data connection to a macro-type base station for an EVDO data session, even though an IMSI is not (by protocol convention) included in the access request(s). Accordingly, the behavior of the AT operating in the first idle state of step 102 accommodates setup of both 1X-RTT and EVDO data sessions, wherein for either type of data session the data connection between a macro-type base station and the PDSN has a unique IMSI identifier.

At step 104, while operating in the first idle state, the access terminal makes a determination that any access request it makes will be sent to a micro-type base station. In accordance with the example embodiment, the AT could make the determination by selecting a particular base station from which to seek access, and recognizing that an identifier of a particular base station is indicative of a micro-type base station. More specifically, an AT operating in an idle state may hand off from one base station to another; i.e., from a source base station to a target base station, as described above. As part of the handoff procedure, the AT acquires system information about the target base station, including some form of identifier. The AT may in turn determine that the identifier is one known to be associated with a micro-type base station. If the AT then seeks access from the target base station, the AT will have determined that it will be sending an access request to a micro-type base station.

For instance, under a CDMA family of protocols, including IS-2000 and IS-856, the AT can receive a "Systems Parameter Message" from a target base station (or cell or sector) after a handoff. As is known, a Systems Parameter Message includes a "Network ID" ("NID") for the target base station. In accordance with the example embodiment, the service provider could configure the wireless communication system so that a certain range (or ranges) of NID values are reserved for femtocells (or other micro-type base stations), while another range (or ranges) of NID values are reserved for macro-type base stations. The AT will maintain this range information, and will thus be able to identify any given base station as either a femtocell (or other micro-type base station) or a macro-type base station according to the given base station's NID.

At step 106, based at least on the determination of step 104, the AT transitions to operating in a second idle state in which at least: the access terminal includes the particular access-terminal identifier in any given access request for a data connection of the second protocol type. As in the first idle state, in the second idle state the AT is not engaged in an active call or data session via any base station. Again, the AT will monitor its paging channel and can initiate a call or data session by issuing an access request. However, unlike the first idle state, the second idle state is characterized (at least) in that the AT now includes the particular access-terminal identifier in any given access request for a data connection of the second protocol type.

In accordance, again, with the example embodiment the second protocol type is EVDO and the access-terminal identifier is a unique IMSI. Thus, when operating in the second idle state, the AT will now include its unique IMSI in access requests for EVDO data sessions, contrary to conventional protocol for EVDO access requests. Since the AT transitioned to the second idle state based on the determination that it would be sending any access requests to a femtocell (or other form of micro-type base station), the operational behavior of the second idle state ensures that femtocells will receive unique IMSIs in access requests from the AT for EVDO data sessions. The advantage of the operational behavior in the second idle state may be seen as follows.

Because the number of femtocells in a wireless communication system is potentially very large, and because there may be practical (or other) limitations to the number of individual base stations that can connect to the AN-AAA server (or servers), femtocells are typically configured to operate without a connection to the AN-AAA server. Consequently, when a given femtocell receives a conventionally-generated EVDO access request—i.e., one that includes the AT's ESN but not a unique IMSI—the given femtocell cannot resolve the ESN into a unique IMSI the way a macro-type base station can. Instead, according to conventional operation the given femtocell assigns a locally-unique IMSI to the AT from a local pool of IMSI values (wherein each value is unique within the pool), and supplies the assigned IMSI to the PDSN for identification of the EVDO data connection. However, while the assigned IMSI may be unique among the pool used by the given femtocell, it is not necessarily unique across all pools of other femtocells. As a result, it is possible for two or more different femtocells to establish separate EVDO connections to the same PDSN using the same IMSI, a condition referred to as "IMSI collision." When an IMSI collision occurs at a PDSN, the two or more EVDO data sessions using the same IMSI can be interrupted or suffer other forms of service degradation. Accordingly, avoidance of IMSI collisions is desirable.

Understood in this context, the unique IMSI provided to femtocells (or other micro-type base stations) in EVDO access requests from ATs operating in the second idle state advantageously enables different femtocells to establish respective EVDO data connections to the same PDSN without the possibility of IMSI collisions, even though the femtocells lack connections to the AN-AAA server. It will be appreciated that the example embodiment can be extended to include any type of base station (even a macro-type) that lacks an operational connection to the AN-AAA server, thus making the advantages of embodiments of the present invention more generally applicable.

The description of the second idle state of step 106 characterizes the operational behavior of the AT in that idle state, and in particular the manner in which the AT generates an EVDO access request when the condition (or conditions) necessitating such a request arises. That is, operation in the second idle state does not necessarily require that the AT will actually send an access request. However, although it is not explicitly illustrated in the flowchart of FIG. 1, the example embodiment can be understood to include a specific step of transmitting an access request to the (micro-type) base station. Thus, while operating the second idle state, the AT may transmit an access request for an EVDO data session to the femtocell, wherein the access request includes the AT's unique IMSI. In this instance, once the requested EVDO session is established, the AT will transition to operating in an active state in which, at least, the AT engages in the EVDO data session via the femtocell. In accordance with the example embodiment, the data connection between the femtocell and the PDSN used for the EVDO data session will have been established using the unique IMSI included in the access request.

It may also occur that the AT transitions at step 106 to operating in the second idle state, but does not actually transmit an access request to the femtocell while operating in the second idle state. For example, the determination at step 104 that leads to the transition of step 106 could be responsive to an idle-state handoff of the AT from a macro-type base station to a femtocell (or other form of micro-type base station), as described above. While not explicitly illustrated in FIG. 1, it could then happen that the AT undergoes a subsequent idle-state handoff from the femtocell back to the same (or a different) macro-type base station without having transmitted an access request. In accordance with the example embodiment, the AT, while operating in the second idle state, would make another determination that any access request it makes will be sent to a macro-type base station, and would responsively transition to operating in the first idle state.

Note that the characterization of the first idle state of step 102 in terms of the access terminal's particular behavior with respect to sending access requests of either protocol type should not be viewed as limiting the first idle state to only the described behavior of that state. The first state could include other behaviors as well, provided those other behaviors don't contradict or are not mutually exclusive with the explicitly-described behavior of the first idle state. Similarly, the characterization of the second idle state of step 106 in terms of the access terminal's different behavior with respect to sending access requests of the second protocol type should also not be viewed as limiting the second idle state to only the described behavior of that state. As with the first idle state, the second idle state could include other behaviors as well, provided those other behaviors don't contradict or are not mutually exclusive with the explicitly-described behavior of the second idle state.

In the discussion of FIG. 1, as well as in other discussions and explanations herein, the terms "first" and "second" as applied to "idle states," "protocols," and the like, are used as identifying labels, and not meant to imply any numerical ordering (although a numerical ordering is not necessarily excluded). It will also be appreciated that the steps of FIG. 1 are shown by way of example, and that additional and/or alternative steps or alternative ordering of steps could be carried out and still remain within the scope and spirit of the present invention.

Figure 2:
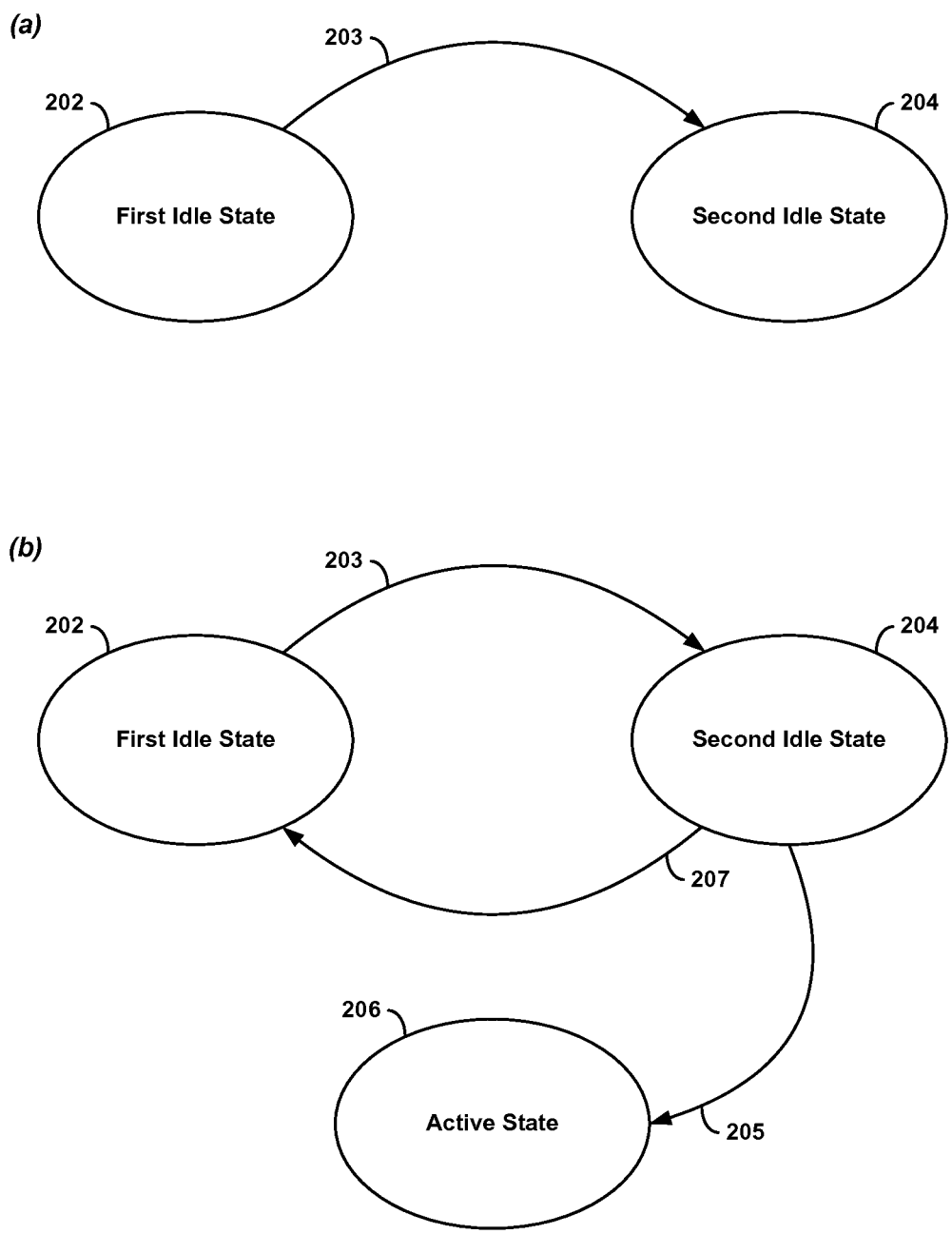
FIG. 2 is a state diagram illustrating an example embodiment of using an IMSI in a data session request to a micro-type base station.

FIG. 2 provides a simple illustration of the first and second idle states, the active state, and the transitions between them. The figure is not meant to represent all possible states and all possible transitions; just those discussed in connection with FIG. 1 above. In panel (a) at the top, an access terminal is operating in the first idle state 202, wherein operation in the first state is characterized by the description above. Responsive to a first determination that any access request the AT makes will be sent to a micro-type base station, the access terminal makes a transition 203 to operating in the second idle state 204, wherein operation in the second state is also characterized above. As discussed above, the first determination could correspond to the AT executing an idle-state handoff to a femtocell (or other macro-type base station), and transition 203 could in turn represent successful completion of that handoff.

Panel (b) reproduces the states and transition of panel (a), and also depicts the active state 206 and transition 205 from the second idle state 204 to the active state 206, as well as transition 207 from the second idle state 204 back to the first idle state 202. In accordance with example embodiment, the active state 206 represents operation of the AT once an EVDO data session is established via a femtocell. The transition 205 to the active state 206 then corresponds to completion of the session setup procedure that results in successful establishment of the EVDO data session via the femtocell.

As described above, while operating in the second idle state 204, the AT may make a second determination that any access request it makes will be sent to a macro-type base station and the responsively transition to operating in the first idle state 202. In accordance with the example embodiment, this transition would occur without the AT first having initiated a call or session via the femtocell while in the second idle state 204, and is represented in FIG. 2 by transition 207. As discussed above, the second determination could correspond to the AT executing an idle-state handoff to a macro-type base station, and transition 207 could in turn represent successful completion of that handoff. Also as noted, the states and transitions depicted in FIG. 2 are not necessarily intended to represent all possible state or transitions of the AT, nor should they be viewed as limiting with respect to the present invention or embodiments thereof.

Figure 3:
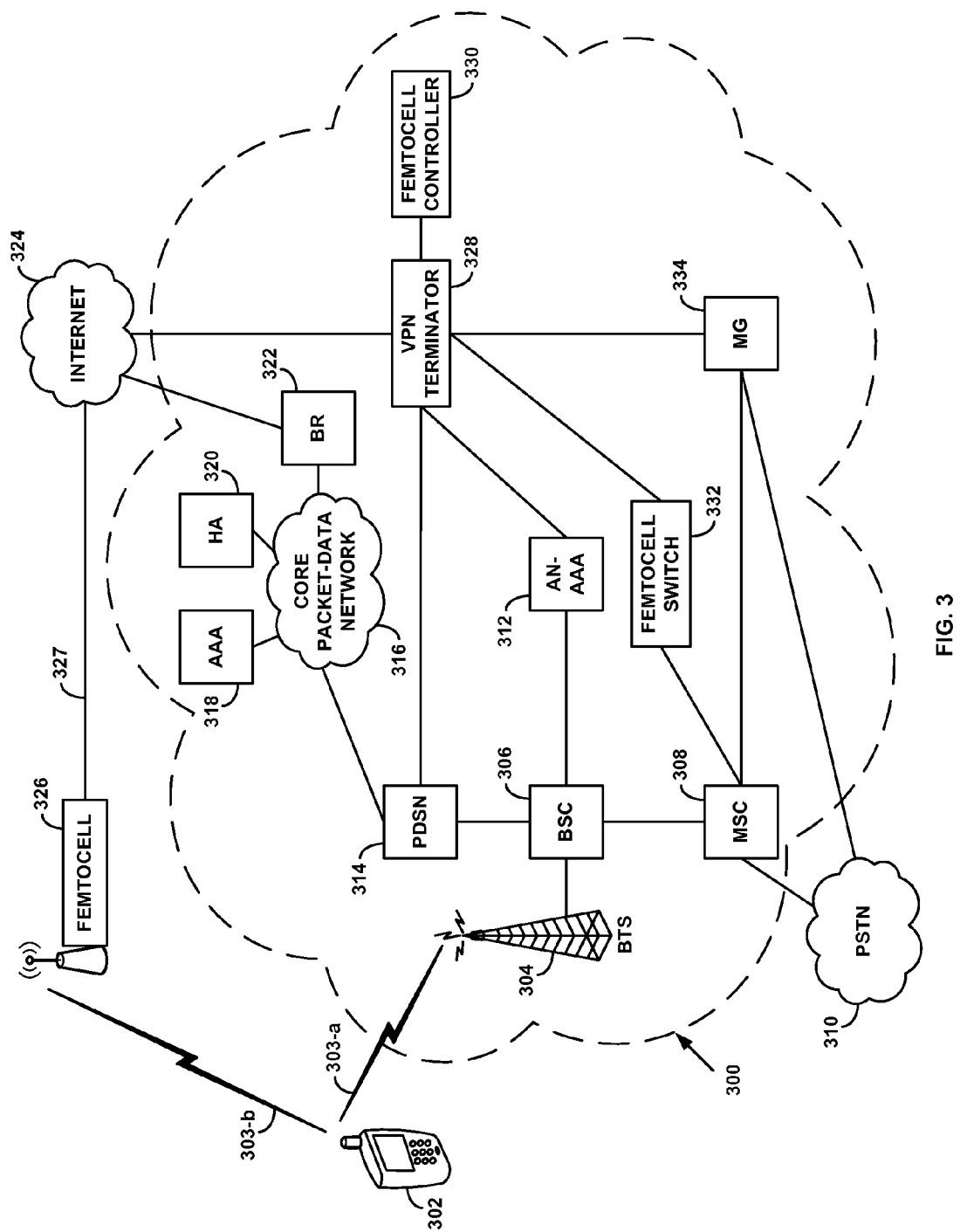
FIG. 3 is a simplified block diagram of a wireless communication system in which an example embodiment of a method of using an IMSI in a data session request to a micro-type base station could be carried out.

FIG. 3 shows a simplified block diagram of a wireless communication network 300 that can be operated by a wireless service provider, and in which an exemplary embodiment of a method and system for providing a unique IMSI in an access request from an access terminal to a base station for an IS-856 data session can be employed. Subscribers engage in communications in the wireless communication system via access terminals, whereby access terminals provide a physical basis for interfacing with the communication system, and subscribers are associated with respective access terminals according to subscriber account information that is maintained by the system in one or more data bases. Accordingly, a subscriber is represented by an associated access terminal AT 302 in FIG. 3.

As shown, AT 302 communicates over an air interface 303-a with a BTS 304, which is then coupled or integrated with a BSC 306. AT 302 is also shown as having an air interface 303-b to femtocell 326. Communicative connections between the femtocell 326 and network 300 are described in more detail below. Transmissions over air interface 303-a from BTS 304 to AT 302 represent a "forward link" from the BTS to the access terminal, while transmissions over interface 303-a from AT 302 to BTS 304 represent a "reverse link" from the AT. Similarly, transmissions over air interface 303-b from femtocell 326 to AT 302 represent a forward link from the femtocell to the access terminal, while transmissions over interface 303-b from AT 302 to femtocell 326 represent a reverse link from the AT. Air interfaces 303-a and 303-b represent links that could be active concurrently or possibly at different times, depending on the operational state of the AT, its physical location with respect to the BTS and the femtocell, and the type data session it seeks or is engaged in.

BSC 306 is connected to MSC 308, which acts to control assignment of air traffic channels (e.g., over air interface 303-a,b), and provides access to wireless circuit-switched services such as circuit-voice and circuit-data (e.g., modem-based packet data) service. As represented by its connection to PSTN 310, MSC 308 is also coupled with one or more other MSCs, other telephony circuit switches in the operator's (or in a different operator's) network, or other wireless communication systems, thereby supporting user mobility across MSC regions, roaming between systems, and local and long-distance landline telephone services.

BSC 306 is also connected to AN-AAA server 312, which supports initial link-level authentication and authorization for 1X-RTT and EVDO data sessions, as mentioned above. Data transport is provided by way of a communicative link between the BSC 306 and a PDSN 314, which in turn provides connectivity with the service provider's core packet-data network 316. Sitting as nodes on network 316 are, by way of example, an authentication, authorization, and accounting (AAA) server 318, a mobile-IP home agent (HA) 320, and a border router BR 322 that provides secure connectivity to internet 324, such as the public Internet. The AAA server 318 provides network- and service-layer authentication and authorization support, and could be combined with AN-AAA server 312. BR 322 could include a firewall or other security mechanisms. Although not shown, core network 316 could comprise one or more additional switches, routers, and gateways that collectively provide transport and interconnection among the various entities and networks of network 300. In this context, for instance, core network 316 could be an overlay on or a sub-network of one or more additional networks.

Continuing with the description of FIG. 3, network 300 also includes a "Virtual Private Network" ("VPN") terminator 328 for terminating secure connections with authorized devices seeking access via unsecure, external networks such as internet 324. For instance, femtocell 326 may connect to internet 324 over a broadband connection 327 (e.g., a cable modem connection or the like) and then to the VPN terminator 328. The femtocell could include a "VPN client" that establishes a secure "tunnel" with a "VPN server" in the VPN terminator such that packet-data communications over the secure tunnel between the femtocell and the VPN terminator can then take place securely. As is known in the art, secure VPN tunnels can be implemented according such protocols as "IPsec," although other mechanisms may be employed.

Assuming a secure VPN connection is established, femtocell 326 may then communicate securely with other entities in network 300 by way of the VPN terminator 328. In particular, femtocell 326 may receive configuration and messaging data and other operational parameters from femtocell controller 330, which provides similar control and services for other femtocells connected to network 300. Femtocell switch 332 acts as a switch between MSC 308 and VPN terminator 328, enabling access terminals communicating via femtocells, such as AT 302 via femtocell 236, to engage in calls via MSC 308 to other wireless devices, as well as over the PSTN 310. Media translation between packet-based media data and circuit-based media data is carried out by media gateway MG 334. Thus, femtocell 326 may transmit packetized data MG 334 (via VPN terminator 328), which in turn translates (or transcodes) the data to circuit-based media for transmission on PSTN 310, for example. MG 334 performs the reverse translation for transmission in the opposite direction.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 302 typically comprises a user-interface, I/O components, a communication interface, a tone detector, a processing unit, and data storage, all of which may be coupled together by a system bus or other mechanism. As such, network 300, AT 302, and air interface 303-a,b, collectively are representative of example means of implementing and carrying out the various functions, steps, and procedures described herein.

As noted above, the term "base station" will be used herein to refer to a Radio Access Network (RAN) element such as a BTS, a BSC, or combination BTS/BSC, for instance. The term "radio network controller" (RNC) can also be used to refer to a BSC, or more generally to a base station. Accordingly, a femtocell may be considered to be form of micro-type base station or micro-type RNC. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CDMA Communications a. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions. Note that an AT's active set can include a femtocell.

With the arrangement described above, an access terminal can engage in cellular voice and/or in packet-data (1X-RTT) communications via either (or both of) a macro-type base station or a femtocell. Referring again to FIG. 3, and taking an originating call or data session from AT 302 as an example, AT 302 first sends an origination request either over air interface 303-a to the BTS 304 or over air interface 303-b to femtocell 326. The BSC 304 sends the request to MSC 308 via BSC 306. Alternatively, femtocell 326 sends the request to MSC 308 via femtocell switch 332. The MSC then signals back to the BSC or the femtocell directing one or the other to assign an air interface traffic channel for use by the access terminal.

For a voice call, the MSC uses well-known circuit protocols to signal call setup and establish a circuit connection to a destination switch that can then connect the call to a called device (e.g., landline phone or another access terminal). The MG 334 provides media translation if access is via the femtocell.

For a packet-data session, the request conventionally includes a unique IMSI associated with AT 320. The BSC or the femtocell signals to the PDSN 314, which negotiates with the access terminal to establish a data link layer connection, such as a point to point protocol (PPP) link. The PPP link includes a data-path segment between the BSC or femtocell and the PDSN, and the IMSI is used to identify this data-path segment. The PDSN 314 sends a foreign agent advertisement that includes a challenge value to the access terminal, and the access terminal responds with a mobile-IP registration request (MIP RRQ), including a response to the challenge, which the PDSN forwards to HA 320. The HA then assigns an IP address for the access terminal to use, and the PDSN passes that IP address via either the BSC or the femtocell to the access terminal.

b. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a "data rate control" (DRC) channel used by the AT to indicate the supportable data rate and best serving sector for the forward link.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Again, a sector could correspond to a femtocell.

Operation in an IS-856 compliant communication system may be illustrated, again with reference to FIG. 3. To acquire an EVDO packet data connection, AT 302 sends a UATI (Universal Access Terminal Identifier) request to BSC 306 (via BTS 304) over air interface 303-a or to femtocell 326 over air interface 303-b. In response, the AT receives a UATI, which the access terminal can then use to identify itself in subsequent communications with the BSC or femtocell. The access terminal then sends a connection-request to the BSC 306 or to femtocell 326. Subsequent procedure depends on whether access is made via a macro-type base station (e.g., BSC 306) or a micro-type base station (e.g., femtocell 326).

For access via a macro-type base station, the BSC 306 responds to the connection-request by invoking a process to authenticate the access terminal and to have the access terminal acquire a data link. In particular, the BSC sends an access request to AN-AAA server 312 (which may be different than the AAA server 318). The access request includes the ESN of AT 302, which by convention is provided by the AT in its initial access request to the BSC. The AN-AAA server authenticates the access terminal and resolves the ESN into a unique IMSI, which is returned to the BSC. The BSC 306 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 312, and the PDSN and access terminal then negotiate to establish a PPP data link. As with a 1X-RTT connection the IMSI is used to identify the data-path segment between the BSC and the PDSN. The access terminal then sends an MIP RRQ to the PDSN, which the PDSN forwards to the HA 320, and the HA assigns a mobile-IP address for the access terminal to use.

As discussed above, a femtocell does not typically maintain a connection to the AN-AAA server. In conventional operation, access via a macro-type (e.g., femtocell 326) therefore does not include authentication and authorization by the AN-AAA server, and consequently the AT's ESN cannot be resolved into a unique IMSI. Instead, the femtocell assigns an IMSI to the AT, which is then used in negotiating the PPP link. As a result, the data-path segment between the femtocell and the PDSN is identified using the assigned IMSI. Again, the access terminal then sends an MIP RRQ to the PDSN, which the PDSN forwards to the HA 320, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS of femtocell using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels. Upon termination of the AT's EVDO session, the AT returns to an idle or dormant mode of operation.

2. Including an IMSI in Access Requests to a Femtocell for an EVDO Data Session

A typical femtocell may be approximately the size of a desktop phone or WiFi access point, and is essentially a low-power, low-capacity version of a macro-type base station. Thus, a typical femtocell will use a normal power outlet, perhaps with a transformer providing a DC power supply. The femtocell may have a wired (e.g., Ethernet) or wireless (e.g., WiFi) connection with a subscriber's broadband connection via a residential router or other broadband interface. As described above, a femtocell may establish a secure VPN to a VPN terminator in the provider's core network, and thereby be able to securely communicate via the VPN terminator with other entities on that core network and beyond.

The femtocell also has a wireless-communication (e.g., CDMA) interface that is compatible with the subscriber's access terminal(s), such that the femtocell may act as a micro-type base station, providing coverage in the wireless-service provider's network via the subscriber's Internet connection. Usually, a femtocell will provide service on a single RF carrier per air interface (e.g., 1X-RTT and EVDO), and also transmit its own pilot signal.

a. Operating Principles

Both 1X-RTT and EVDO data sessions include a data-path segment between the base station and the PDSN that supports a PPP link between the access terminal and the PDSN. In accordance with a CDMA family of protocols, including IS-2000 and IS-856, the communicative connection between the base station and the PDSN is designated the "A10/A11 interface." For a macro-type base station, physical link (or links) of the A10/A11 interface is generally accommodated entirely within the RAN, as represented by the single connection between BSC 306 and PDSN 314 in FIG. 3, for instance. (The A10/A11 interface is actually defined between the PDSN and a "Packet Control Function," or "PCF," configured between the BSC the PDSN. For the purposes of the discussion herein, however, there is no loss in generality with respect to the present invention or embodiments thereof to omit explicit reference to the PCF and consider the A10/A11 as being between the BSC and the PDSN.) For a femtocell (or other micro-type base station), the physical link (or links) of the A10/A11 interface traverses a VPN tunnel between the femtocell and a VPN terminator in the RAN, as discussed above also in connection with FIG. 3. For either type of data session, the PDSN identifies the PPP link that runs over the A10/A11 interface according to the IMSI of the access terminal, as noted above.

For a given access terminal, a unique ESN is assigned by the manufacturer, while a unique IMSI is typically assigned by the service provider, usually in conjunction with creation and configuration of and account for the subscriber associated with the AT. For instance, the IMSI could be a calling-station ID, such as a phone number or other identifier. As such, IMSIs are reusable and the same unique IMSI could be assigned by the service provider to different ATs and different times, while ESN are fixed to AT hardware. The association of an IMSI with a particular AT is typically tracked in one or another database in the service provider's network. In particular, the AN-AAA server maintains (among other information) an association between the ESN of a given AT and the IMSI assigned to the AT.

As described above, an access terminal supplies its unique IMSI in access requests for 1X-RTT connections in accordance with protocol requirements of 1X-RTT. The IMSI in the access request is then used to identify the A10/A11 connection that is negotiated between either the BSC or the femtocell and the PDSN. Because the IMSI is unique, every A10/A11 connection established at a given PDSN has a unique IMSI identifier.

Unlike 1X-RTT, the protocol requirements of EVDO do not specify that an AT's unique IMSI should be included in access requests for EVDO data sessions. Hence, when an AT seeks access for an EVDO data session according to conventional operation, it includes its ESN but not its IMSI in the access request. In practice, a macro-type base station that receives such a request executes an authentication an authorization transaction with the AN-AAA server, supplying the AT's ESN in the transaction. More specifically, the connection between the BSC and the AN-AAA server is designated as the "A12 interface," and the transaction comprises "A12 terminal authentication." If the A12 terminal authentication is successful, the AN-AAA server resolves the ESN into the AT's unique IMSI and returns the unique IMSI to the BSC. The BSC may in turn establish an A10/A11 connection to the PDSN using the unique IMSI.

Femtocells are generally marketed as consumer electronics products. Consequently, the number of femtocells that connect to a service provider's network can greatly exceed the number of macro-type base stations in the service provider's network. For various practical reasons, among others, the AN-AAA server cannot generally accommodate an A12 interface to each of the potentially large number of the femtocells connected to the service provider's network. Accordingly, operation of a femtocell is adapted to the absence of a connection to the AN-AAA server by turning off or disabling the A12 terminal authentication in the femtocell.

More particularly, when a femtocell receives a conventional EVDO access request from an AT—i.e., one that includes the AT's ESN but not its IMSI—the femtocell assigns a local IMSI to the AT. In practice, the femtocell selects an IMSI at random from a local pool of available IMSIs. The locally-assigned IMSI is then used to identify the A10/A11 interface connection between the femtocell and the PDSN. In this conventional way, femtocells support EVDO session establishment without A12 terminal authentication.

Each local IMSI is unique within the local pool, so that two or more (up to the total number in the pool) AT's may each be assigned a locally-unique IMSI by the femtocell. However, local IMSIs are not guaranteed to be unique across different femtocells. Consequently, in conventional operation it is possible for two (or more) different femtocells to assign the same IMSI to ATs seeking EVDO connections with them. If the different femtocells also establish A10/A11 interface connections with the same PDSN, those connections will not have unique IMSI identifiers. As noted above, this situation is called IMSI collision, and can result in termination of one or all of the EVDO sessions having the same IMSI, or other service degradation. It would clearly be desirable to eliminate IMSI collisions that can arise in conventional operation.

Accordingly, an example embodiment of the present invention provides a method and means for an IMSI to be included in an EVDO access request, and for an A10/A11 interface connection between a micro-type base station (or any base station that does not perform A12 terminal authentication) and a PDSN to be established and identified using the IMSI included in the EVDO access request. More particularly, an access terminal will include its unique IMSI in EVDO access requests to femtocells, and a femtocell receiving an EVDO access request containing the AT's IMSI will use this IMSI instead assigning a local IMSI. Advantageously, IMSI collisions on A10/A11 interface connections between femtocells and PDSNs for EVDO data sessions will be eliminated. The example embodiment is described below.

b. Access Terminal Operation

In accordance with the example embodiment, when an access terminal operating in an idle state sends an EVDO access request to its serving base station, the AT will determine (or will have previously determined) whether its serving base station is macro-type base station or a micro-type base station. If the serving base station is a macro-type base station, the AT will generate and transmit an access request according to protocol convention for EVDO; i.e., an access request that omits the AT's IMSI. If, instead, the serving base station is a micro-type base a femtocell (or other micro-type base station), the AT will generate and transmit an EVDO access request that includes the AT's unique IMSI. Advantageously, this will allow the receiving femtocell to establish a uniquely-identified A10/A11 connection with a PDSN, and thereby eliminate possible IMSI collision. When sending a 1X-RTT access request, the AT will operate according to protocol convention, since 1X-RTT access requests include the IMSI.

Since the AT has different idle-state behavior with respect to access requests depending on the type of its current serving base station, its operation may be viewed as describing two different idle states. In the first idle state, the AT's serving base station is a macro-type base station and the AT operates conventionally with respect to both 1X-RTT and EVDO access requests. In the second idle state, the AT's serving base station is a micro-type base station and the AT then includes its IMSI in EVDO access requests. This description corresponds with the earlier discussion of FIGS. 1 and 2.

The AT may determine the type (macro or micro) of its serving base station based on information supplied by the RAN. More particularly, when an access terminal begins operation in a wireless communication system, it first "acquires" the system by listening for a pilot signal and then registering with the base station (or sector, for example) that emits the strongest detected pilot signal (details of system acquisition and registration are well known, and not discussed here in detail; the simplified explanation herein should not be viewed as limiting with respect the present invention or embodiments thereof). Once the AT acquires the system and registers, it begins operating in an idle state. In this state, the AT can initiate outgoing calls and/or data sessions, and receive alerts of incoming calls and other "overhead" (e.g., informational) messages from the RAN by periodically listening to one or more paging and/or control channels. The AT may also hand off from a source base station to a target base station while operating in an idle state. Upon execution of such an idle-state handoff, the AT monitors the paging channel of the target base station.

Among the overhead messages that an AT can receive as part of the registration process or by monitoring its paging channel is a Systems Parameters Message. The System Parameters Message includes (among other information) an ID that identifies the base station or a RAN or RAN subnetwork to which the base station belongs. In accordance with the example embodiment, the AT will use the identifier in the Systems Parameter Message in order to determine whether the base station is a macro-type base station or a micro-type base station.

More specifically, the service provider can configure the identifiers (and the base stations to which they apply) in such a manner that certain ranges of identifier values are associated with macro-type base stations, while other ranges are associated (or reserved for association) with micro-type base stations (e.g., femtocells). Further, the AT can be provided or configured with the ID range information. In this way, the AT can determine the range to which the identifier in the System Parameters Message belongs, and hence determine whether the base station is a macro-type base station or a micro-type base station. Because the AT receives the System Parameters Message upon registration, and also periodically on the paging channel, the AT will be able to determine at such time that it makes an EVDO access request which type of base station will be receiving its access request. In accordance with the example embodiment, the AT will include its IMSI in an access request to a femtocell, and omit its IMSI in an access request to a macro-type base station.

It will be appreciated that the example embodiment can be extended to include any type of base station that lacks an A12 interface or for which A12 terminal authentication is turned off or disabled. Thus, the ID ranges used to distinguish macro-type base stations from femtocells could additionally or alternatively distinguish base stations having A12 terminal authentication enabled from those having A12 terminal authentication disabled. Advantageously, the AT can then make a determination to include its IMSI in EVDO access requests to base stations having A12 terminal authentication disabled, while transmitting conventional EVDO access requests otherwise. It will also be appreciated that a message other than a System Parameters Message may be used to provide an access terminal with information that allows it to determine the type of its serving base station.

c. Micro-Type Base Station Operation

In further accordance with the example embodiment, a micro-type base station that receives an EVDO access request including an IMSI will establish an A10/A11 interface connection to an appropriate PDSN using the included IMSI. By so doing, the micro-type base station will ensure that the A10/A11 interface connection for the EVDO session is uniquely identified, just as it would be if A12 terminal authentication had been carried out. Thus, numerous femtocells widely deployed and connected to a service provider's network (e.g., via secure VPNs as described above) can all support establishment of uniquely-identified A10/A11 connections for EVDO session to any number of PDSN in the service provider's network. At that same time, any practical limitations to supporting an A12 interface between each of numerous femtocells and the AN-AAA server do not have to be overcome as a means of eliminating IMSI collisions for EVDO data sessions.

A micro-type base station that receives either a 1X-RTT access request or an EVDO access request that does not include an IMSI will behave according to protocol convention. Thus, IMSI collisions could still arise if an access terminal making an EVDO access request fo a femtocell does not include its IMSI in the access request. However, by implementing the example embodiment in most, if not all, ATs and femtocells, the possibility of IMSI collisions can be significantly reduced.

3. Implementation of Example Embodiment

As described above, the example embodiment involves actions and operations carried out by both the access terminal and the micro-type base station (e.g., femtocell). As such, the example embodiment may be considered as comprising a "client-side," associated with the access terminal (or other client communication device), and a "system-side," associated with the femtocell. The example embodiment can be implemented as executable steps and operations of a client-side method carried out by an access terminal, and as executable steps and operations of a system-side method carried out by a femtocell.

Implementation of the example embodiment can further be considered as including means for carrying out both the client-side method and the system-side method. An example implementation of both the client-side method and means and the system-side method and means is described below. By way of example, both the access terminal and the femtocell are taken to be configured to operate according to a CDMA family of protocols, including IS-2000 and IS-856, in a similarly-compliant wireless communication system, such as the one described above in connection with FIG. 3.

a. Example Method Implementation in an Access Terminal

Figure 4:
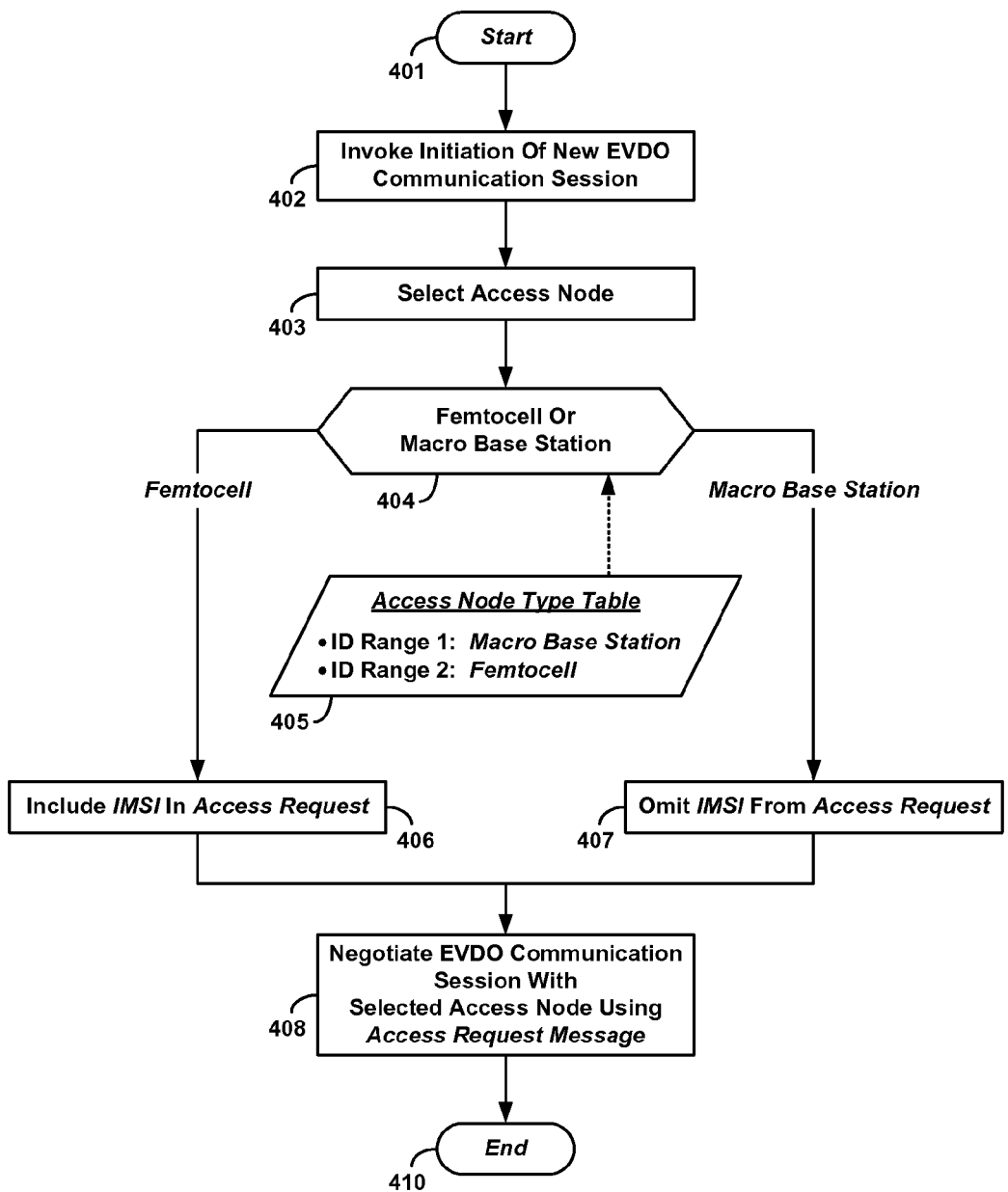
FIG. 4 illustrates an example embodiment of logical steps for implementing in an AT a method of using an IMSI in a data session request to a micro-type base station.

FIG. 4 is a logical flowchart representing executable steps and operations that could be carried out by an access terminal to implement a client-side method of including an IMSI in an EVDO access request. The illustrated steps could be implemented in an AT (or similar device) as executable instructions stored in the memory of the AT and executed by one or more processors of the AT.

The process as illustrate begins at start 401, wherein the AT may be considered to be in an idle state. As such, the AT has identified a serving base station, and is monitoring the paging channel from that base station.

At step 402, the AT invokes initiation of an EVDO data session. This action could be carried out in response to a subscriber requesting such a session, for example by pressing an appropriate combination of keys on the AT or invoking a data application, such as email or a browser.

The AT selects a base station from which to seek access at step 403. In FIG. 4, the more general designation "Access Node" is used for base station. In accordance with the example embodiment, the selected access node would be the AT's serving base station. Thus the selection could be considered as having been made when the AT selected its serving base station (e.g., as a result of an idle-state handoff).

At step 404, the AT determines whether the access node is a femtocell or a macro-type base station. In further accordance with the example embodiment, the AT will consult an "Access Node Type Table" 405 to make this determination. This table could contain an association of ID ranges with base station types, as described above. By way of example in FIG. 4, macro-type base stations are associated with "ID Range 1" while femtocells are associated with "ID Range 2" in the table.

If the access node is a femtocell ("Femtocell" branch from step 404), the AT includes its IMSI in the access request, as indicated at step 406. This corresponds to an EVDO access request that advantageously provides the femtocell with a unique IMSI, as described above. If instead the access node is a macro-type base station ("Macro Base Station" branch from step 404), the AT omit its IMSI from the access request, as indicated at step 407. This corresponds to a conventional EVDO access request.

Either of steps 406 or 407 then leads to step 408, wherein the AT sends the EVDO access request to the access node as part of the process of negotiating and EVDO data session with the RAN. If the access node is a femtocell, the EDVO session established in accordance with the example embodiment will thereby have a unique IMSI identifier for the A10/A11 interface connection between the access node and the PDSN, just as it does for a conventionally-established EVDO session via a macro-type base station.

It will be appreciated that the steps shown in FIG. 4 are meant to illustrate operation of the example embodiment. As such, various steps could be altered or modified, the ordering of certain steps could be changed, and additional steps could be added, while still achieving the overall desired operation.

b. Example Method Implementation in a Base Station

Figure 5:
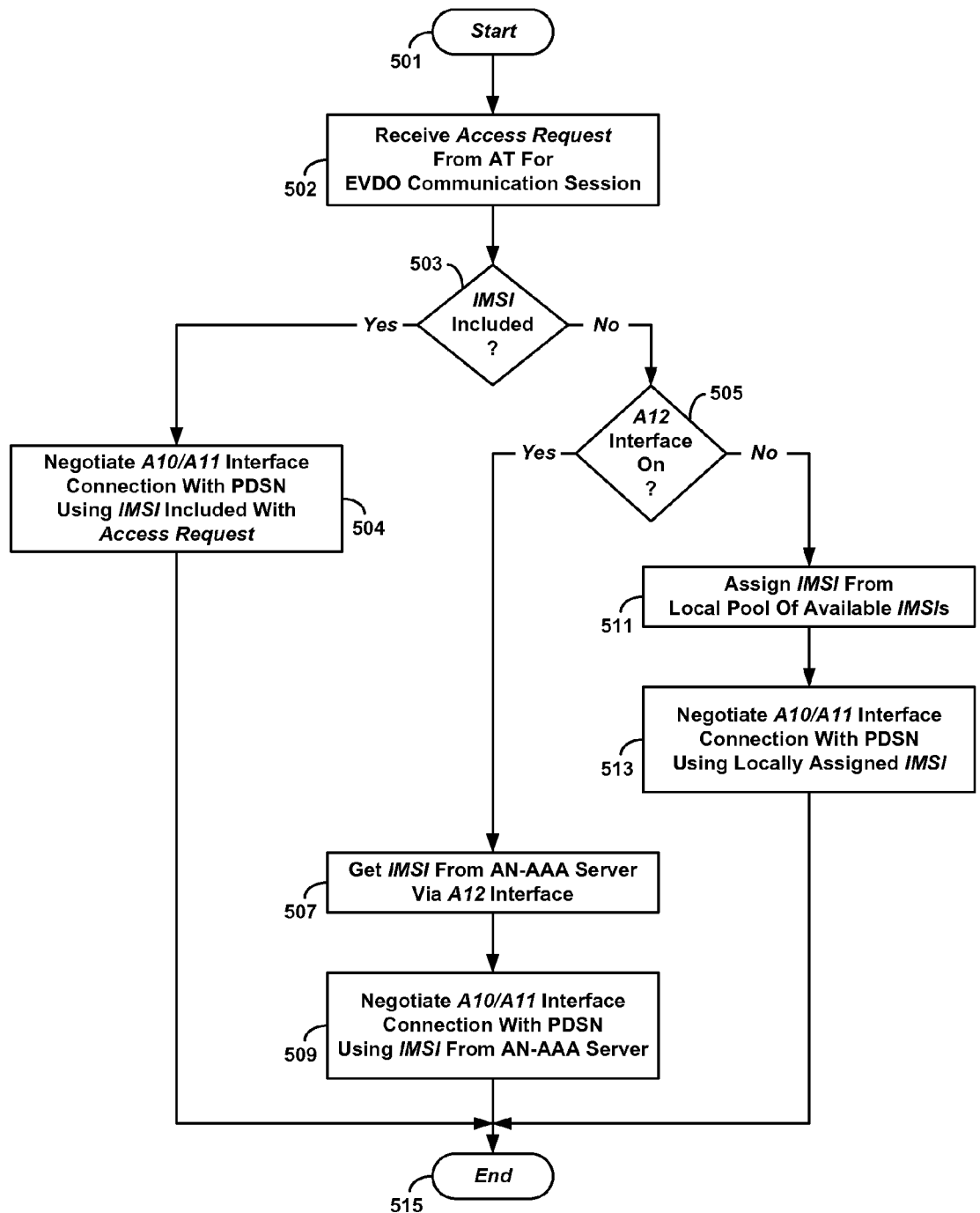
FIG. 5 illustrates an example embodiment of logical steps for implementing in a micro-type base station a method of using an IMSI in a data session request to a micro-type base station.

FIG. 5 is a logical flowchart representing executable steps and operations that could be carried out by micro-type base station to implement a system-side method of including an IMSI in an EVDO access request. The illustrated steps could be implemented in a femtocell as executable instructions stored in the memory of the femtocell and executed by one or more processors of the femtocell.

The process as illustrate begins at start 501, wherein the femtocell may be acting as a serving base station (or access node) for one or more access terminals.

At step 502, the femtocell receives an access request from an AT for an EVDO data session. The femtocell then determines at step 503 if an IMSI is included in the access request. If an IMSI is included ("Yes" branch from step 503), the femtocell negotiates an A10/A11 interface connection with the PDSN using the included IMSI. Once the EVDO session is established, the process is complete, as represented by the end block 515. Thus, in accordance with the example embodiment, the A10/A11 interface connection established for the requested EVDO data session has a unique identifier without the need for A12 terminal authentication to resolve the AT's ESN into its IMSI.

If at step 503 the IMSI is not included ("No" branch from step 503), the femtocell then determines at step 505 if there is an active A12 interface to the AN-AAA server. That is, the femtocell determines if A12 terminal authentication is turned on (enabled). If A12 terminal authentication is enabled ("Yes" branch from step 505), the femtocell executes the authentication and receives the AT's IMSI from the AN-AAA server as indicated at step 507. Then at step 509, the femtocell negotiates an A10/A11 interface connection with the PDSN using the IMSI returned from the AN-AAA server. When the EVDO session is established, the process is complete, again as represented by the end block 515. This branch of the process corresponds to conventional establishment of an EVDO session when A12 terminal authentication is enabled.

If it is determined at step 505 that A12 terminal authentication is not enabled ("No" branch from step 505), the femtocell assigns an IMSI from a local pool of IMSIs as indicated at step 511. The pool could be stored in the some form of memory (e.g., solid state, disk, etc.) associated with the femtocell, and assignment could be done as a random selection from the pool. At step 513, the femtocell then negotiates an A10/A11 interface connection with the PDSN using the assigned IMSI. When the EVDO session is established, the process is complete, once more as represented by the end block 515. This branch of the process corresponds to conventional establishment of an EVDO session via a femtocell when A12 terminal authentication is not enabled.

As discussed above, A12 terminal authentication is typically not turned on for femtocells, but it could possibly be turned on in some instances or for some particular femtocells. So the determination at step 505 accommodates both situations for a femtocell. Further, the present example embodiment could be extended to any type of access node or base station (or RNC). As such the determination at step 505 can be seen as accommodating any type of base station that might or might not have A12 terminal authentication enabled.

It will be appreciated that the steps shown in FIG. 5 are meant to illustrate operation of the example embodiment. As such, various steps could be altered or modified, the ordering of certain steps could be changed, and additional steps could be added, while still achieving the overall desired operation.

c. Example Access Terminal

Figure 6:
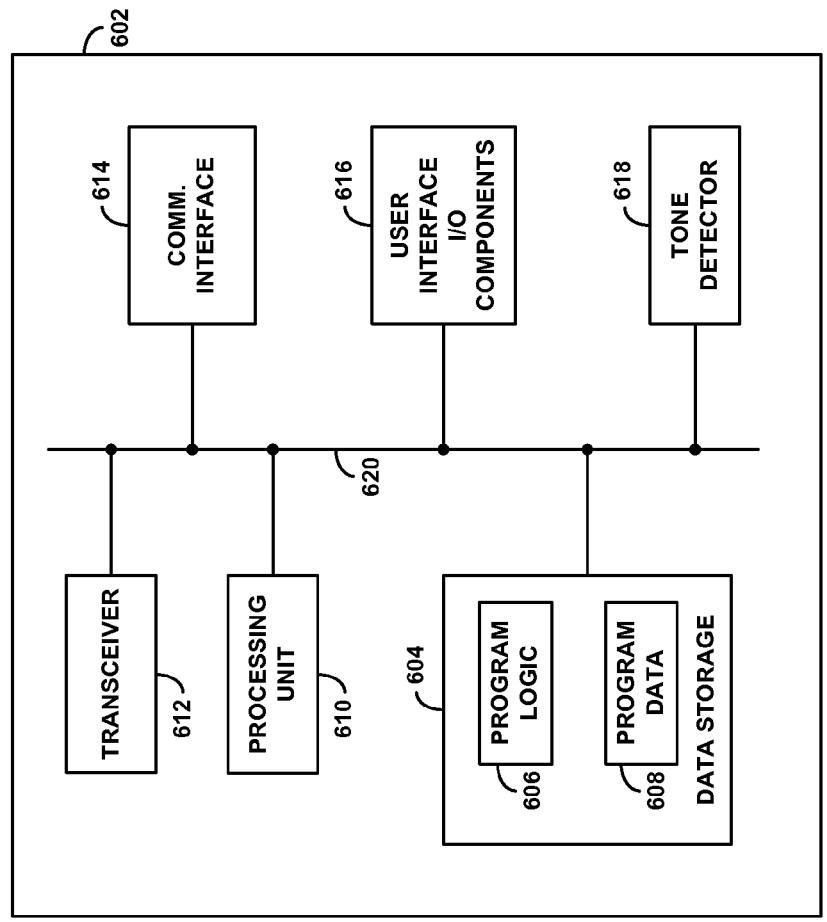
FIG. 6 is a block diagram of an example access terminal in which using an IMSI in a data session request to a micro-type base station may be implemented.

FIG. 6 is a simplified block diagram depicting functional components of an example access terminal 602 in which client-side operation of including an IMSI in an EVDO access request may be implemented. The example AT 602 could be a cell phone, a personal digital assistant (PDA), a pager, a wired or wirelessly-equipped notebook computer, or any other sort of device, as represented by AT 302 in FIG. 3 for example. As shown in FIG. 6, the example AT 602 includes data storage 604, processing unit 610, transceiver 612, communication interface 614, user-interface I/O components 616, and tone detector 618, all of which may be coupled together by a system bus 620 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 602 relevant to including an IMSI in an EVDO access request are discussed briefly below.

Communication interface 614 in combination with transceiver 612, which may include one or more antennas, enables communication with the network, including reception paging messages and System Parameters Messages from the serving base station and transmission of both 1X-RTT and EVDO access request, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 610 comprises one or more general-purpose processors (e.g., INTEL microprocessors) and/or one or more special-purpose processors (e.g., dedicated digital signal processor, application specific integrated circuit, etc.). In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise machine language instructions that define routines executable by processing unit 610 to carry out various functions described herein. In particular the program logic, communication interface, and transceiver may operate cooperatively to carry out logical operation such as that discussed above and illustrated in FIG. 4. Further, program data 608 may be arranged to store the Access Node Type Table (or a similar data structure), as described above.

It will be appreciated that there can be numerous specific implementations of an access terminal, such as AT 602, in which the client-side method of including an IMSI in an EVDO access request could be implemented. Further, one of skill in the art would understand how to devise and build such an implementation. As such, AT 602 is representative of means for carrying out a client-side method of including an IMSI in an EVDO access request, in accordance with the methods and steps described herein by way of example.

d. Example Base Station

Figure 7:
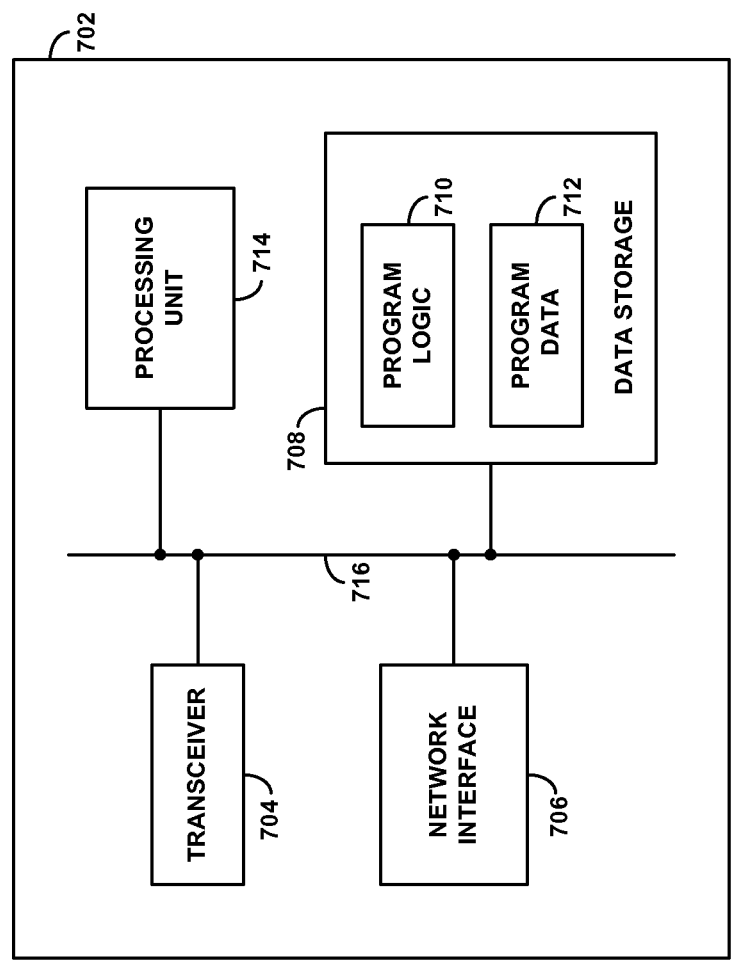
FIG. 7 is a block diagram of an example base station in which using an IMSI in a data session request to a micro-type base station may be implemented.

FIG. 7 is a simplified block diagram depicting functional components of an example femtocell 702 in which system-side operation of including an IMSI in an EVDO access request may be implemented. As shown in FIG. 7, the example femtocell 702, representative of femtocell 326 in FIG. 3, for instance, includes a transceiver 704, network interface 706, a processing unit 714, and data storage 708, all of which may be coupled together by a system bus 716 or other mechanism. In addition, the base station may also include external storage, such as magnetic or optical disk storage, although this is not shown in FIG. 7.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of base station 702 relevant to including an IMSI in an EVDO access request are discussed briefly below.

Network interface 706 enables communication on a network, such network 300, either directly or via an external connection such as VPN over a broadband connection. As such, network interface 706 may take the form of an Ethernet network interface card or other physical interface to a broadband connection to the internet or some other data network, and further can support a VPN connection terminated in a communication network such as network 300, for instance. Further, network interface 706 in combination with transceiver 704, which may include one or more femtocell-scale BTS antennas, enables air interface communication with one or more access terminals, supporting both forward-link and reverse-link CDMA-based transmissions.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program logic 710 may comprise machine language instructions that define routines executable by processing unit 714 to carry out various functions described herein. In particular the program logic, communication interface, and transceiver may operate cooperatively to carry out logical operation such as that discussed above and illustrated in FIG. 5.

It will be appreciated that there can be numerous specific implementations of a femtocell, such as femtocell 702, in which the system-side method of including an IMSI in an EVDO access request could be implemented. Further, one of skill in the art would understand how to devise and build such an implementation. As such, femtocell 702 is representative of means for carrying out a system-side method of including an IMSI in an EVDO access request, in accordance with the methods and steps described herein by way of example.

4. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal configured to operate in a wireless communication system that includes at least one micro-type base station, a method comprising:
    the access terminal operating in a first idle state in which at least: (i) the access terminal includes a particular identifier in any given access request for a data connection of a first protocol type, the particular identifier being uniquely associated with the access terminal and being required by the first protocol to be included in access requests for data connections of the first protocol type, and (ii) the access terminal omits the particular identifier in any given access request for a data connection of a second protocol type, the particular identifier not being specified by the second protocol to be included in access requests for data connections of the second protocol type;
    while operating in the first idle state, the access terminal making a first determination that any access request it makes will be sent to a micro-type base station; and
    based at least on the first determination, transitioning to operating in a second idle state in which at least: the access terminal includes the particular identifier in any given access request for a data connection of the second protocol type.

2. The method of claim 1, wherein the access terminal and the wireless communication system are configured to operate according to a CDMA family of protocols, including at least 1X-RTT and EVDO,
    and wherein the first protocol type is 1X-RTT, the second protocol type is EVDO, and the particular identifier is an IMSI.

3. The method of claim 1, wherein the access terminal and the wireless communication system are configured to operate according to a CDMA family of protocols, including at least 1X-RTT and EVDO,
    wherein the wireless communication system further includes a macro-type base station, the macro-type base station comprising a BTS under the control of one of a BSC and an RNC,
    and wherein the micro-type base station comprises a femtocell.

4. The method of claim 1, wherein making the first determination comprises:
    determining that any access request the access terminal makes will be sent to a particular base station in the wireless communication system;
    receiving a message from the particular base station, the message including an identifier of the particular base station; and
    determining that the particular base station is a micro-type base station based on the identifier of the particular base station.

5. The method of claim 4, wherein the access terminal and the wireless communication system are configured to operate according to a CDMA family of protocols, including at least 1X-RTT and EVDO,
    wherein the micro-type base station comprises a femtocell,
    wherein determining that any access request the access terminal makes will be sent to the particular base station comprises executing an idle handoff to the particular base station,
    wherein the message comprises a System Parameters Message and the identifier comprises a network ID (NID),
    and wherein determining that the particular base station is a micro-type base station based on the identifier of the particular base station comprises correlating the NID with a range of NIDs known to be associated with femtocells.

6. The method of claim 1, further comprising:
    while operating in the second idle state, transmitting an access request for a data connection of the second protocol type to the micro-type base station, the access request including the particular identifier; and
    thereafter transitioning to operating in an active state in which at least: the access terminal engages in a data communication session via the micro-type base station, wherein the data communication session is established based at least in part on the particular identifier included in the access request.

7. The method of claim 6, wherein the access terminal and the wireless communication system are configured to operate according to a CDMA family of protocols, including at least 1X-RTT and EVDO,
    wherein the first protocol type is 1X-RTT, the second protocol type is EVDO, and the particular identifier is an IMSI,
    wherein the micro-type base station comprises a femtocell, and wherein the data communication session is an EVDO data communication session.

8. The method of claim 1, wherein the wireless communication system further includes at least one macro-type base station, and wherein the method further comprises:
while operating in the second idle state, the access terminal making a second determination that any access request it makes will be sent to a macro-type base station; and
based at least on the second determination, transitioning to operating in the first idle state.

9. An access terminal configured to operate in a wireless communication system that includes at least one micro-type base station, the access terminal comprising:
means for operating in a first idle state in which at least: (i) the access terminal includes a particular identifier in any given access request for a data connection of a first protocol type, wherein the particular identifier is uniquely associated with the access terminal and is required by the first protocol to be included in access requests for data connections of the first protocol type, and (ii) the access terminal omits the particular identifier in any given access request for a data connection of a second protocol type, wherein the particular identifier is not specified by the second protocol to be included in access requests for data connections of the second protocol type;
means for making a first determination that any access request the access terminal makes will be sent to a micro-type base station; and
means for, based at least on the first determination, transitioning to operating in a second idle state in which at least: the access terminal includes the particular identifier in any given access request for a data connection of the second protocol type.

10. The access terminal of claim 9, wherein the access terminal is further configured to operate according to a CDMA family of protocols, including at least 1X-RTT and EVDO,
and wherein the first protocol type is 1X-RTT, the second protocol type is EVDO, and the particular identifier is an IMSI.

11. The access terminal of claim 9, wherein the access terminal is further configured to operate according to a CDMA family of protocols, including at least 1X-RTT and EVDO,
wherein the wireless communication system further includes a macro-type base station, the macro-type base station comprising a BTS under the control of one of a BSC and an RNC,
and wherein the micro-type base station comprises a femtocell.

12. The access terminal of claim 9, wherein making the first determination comprises:
determining that any access request the access terminal makes will be sent to a particular base station in the wireless communication system;
receiving a message from the particular base station in the wireless communication system, the message including an identifier of the particular base station; and
determining that the particular base station is a micro-type base station based on the identifier of the particular base station.

13. The access terminal of claim 12, wherein the access terminal is further configured to operate according to a CDMA family of protocols, including at least 1X-RTT and EVDO,
wherein the micro-type base station comprises a femtocell,
wherein determining that any access request the access terminal makes will be sent to the particular base station comprises executing an idle handoff to the particular base station,
wherein the message comprises a System Parameters Message and the identifier comprises a network ID (NID),
and wherein determining that the particular base station is a micro-type base station based on the identifier of the particular base station comprises correlating the NID with a range of NIDs known to be associated with femtocells.

14. The access terminal of claim 9, further comprising:
means for transmitting an access request for a data connection of the second protocol type to the micro-type base station while operating in the second idle state, the access request including the particular identifier; and
means for thereafter transitioning to operating in an active state in which at least: the access terminal engages in a data communication session via the micro-type base station, wherein the data communication session is established based at least in part on the particular identifier included in the access request.

15. The access terminal of claim 14, wherein the access terminal is further configured to operate according to a CDMA family of protocols, including at least 1X-RTT and EVDO,
wherein the first protocol type is 1X-RTT, the second protocol type is EVDO, and the particular identifier is an IMSI,
wherein the micro-type base station comprises a femtocell,
and wherein the data communication session is an EVDO data communication session.

16. The access terminal of claim 9, wherein the wireless communication system further includes at least one macro-type base station,
and wherein the access terminal further comprises:
means for making a second determination that any access request the access terminal makes will be sent to a macro-type base station; and
means for, based at least on the second determination, thereafter transitioning to operating in the first idle state.

* * * * *